(12) United States Patent
Banerjee et al.

(10) Patent No.: US 7,608,190 B1
(45) Date of Patent: Oct. 27, 2009

(54) PROCESS FOR REMOVING BARIUM FROM WATER

(75) Inventors: Kashi Banerjee, Moon Township, PA (US); Charles D. Blumenschein, Pittsburgh, PA (US)

(73) Assignee: N.A. Water Systems, LLC, Moon Township, PA (US)

( * ) Notice: Subject to any disclaimer, the term of this patent is extended or adjusted under 35 U.S.C. 154(b) by 0 days.

(21) Appl. No.: 12/271,506

(22) Filed: Nov. 14, 2008

(51) Int. Cl.
*C02F 3/00* (2006.01)

(52) U.S. Cl. .................. 210/663; 210/665; 210/688; 210/724

(58) Field of Classification Search .............. 210/663, 210/665, 688, 724
See application file for complete search history.

(56) References Cited

U.S. PATENT DOCUMENTS

| | | | |
|---|---|---|---|
| 5,728,302 | A | 3/1998 | Connor et al. |
| 7,081,204 | B2 | 7/2006 | Bandorick et al. |
| 2009/0036301 | A1* | 2/2009 | Matsuda et al. ............. 502/324 |

OTHER PUBLICATIONS

Ruekert and Mielke, Inc., State Of the Art Of Water Supply Practices, Technical Report, Jul. 2007, No. 43, Waukesha, WI.
Tonka Equipment Company, Effective Radium Removal with HMO, Tonka Technical Bulletin, Plymouth, MN.
Koulouris, G., Dynamic Studies On Sorption Characteristics Of 226RA On Manganese Dioxide, Journal of Radioanalytical and Nuclear Chemistry, 1995, 269-279, Vol. 193, No. 2, Elsevier Science S. A., Lausanne and Akademiai Kiado, Budapest.
Christensen, Terkel C. and Ulf Richter, Treatment Of Water With Dissolved Heavy Metals, pp. 1-17, Krüger, Soborg, Denmark.
Christensen, Terkel C., Jonas Nedenskov and Peter Simonsen, Treatment Of Leachate From Tipped Residues From Incineration, pp. 1-13, Krüger, Hvidovre, Denmark.
Christensen, Terkel C., Jonas Nedenskov and Marcus Müller, Treatment Of Leachate From Tipped APC-Residues At AV, pp. 1-7, Krüger, Hvidovre, Denmark.
Loganathan, P. and R. G. Burau, Sorption Of Heavy Metal Ions By A Hydrous Manganese Oxide, Geochimica et Cosmochimica Acta, 1973, pp. 1277-1293, vol. 37, Pergamon Press, Northern Ireland.
Murray, James W., The Interaction Of Metal Ions At The Manganese Dioxide-Solution Interface, Geochimica et Cosmochimica Acta, 1975, pp. 505-519, vol. 30, Pergamon Press, Northern Ireland.
Posselt, Hans S. and Frederick J. Anderson, Cation Sorption On Colloidal Hydrous Manganese Dioxide, Environmental Science and Technology, Dec. 1968, pp. 1087-1093, vol. 2 No. 12.

(Continued)

*Primary Examiner*—Chester T Barry
(74) *Attorney, Agent, or Firm*—Coats & Bennett, P.L.L.C.

(57) ABSTRACT

A method for reducing barium concentration in waste streams. Hydrous manganese oxide (HMO) is formed in solution/slurry and mixed with water containing barium such that the hydrous manganese oxide exhibits a negative charge at a desired pH. Barium from the water is adsorbed onto the negatively charged HMO surface. The HMO with adsorbed barium is separated from the water, producing treated effluent having a reduced barium concentration.

33 Claims, 9 Drawing Sheets

OTHER PUBLICATIONS

Kanungo, Sukriti B., Sushree Swarupa Tripathy and Rajeev, Adsorption of Co, Ni, Cu, and Zn On Hydrous Manganese Dioxide From Complex Electrolyte Solutions Resembling Sea Water in Major Ion Content, Journal of Colloid and Interface Science, 2004, pp. 1-10, vol. 269, Elsevier Inc.

Anderson, B. J., E. A. Jenne and T. T. Chao, The Sorption Of Silver By Poorly Crystallized Manganese Oxides, Geochimica et Cosmochimica Acta, 1973, pp. 611-622, vol. 37, Pergamon Press, Northern Ireland.

* cited by examiner

PROCESS FOR REMOVING BARIUM FROM WATER

FIELD OF INVENTION

The present invention relates to methods for reducing barium concentration in water.

BACKGROUND

Barium is often released into wastewater in industrial manufacturing operations. The barium concentration of industrial wastewater is generally toxic and should be removed from the wastewater for proper disposal. If barium is not removed from wastewater before disposal, barium can seep into the groundwater and soil. Groundwater in the midwestern region of the United States contains soluble barium. Exposure to barium may cause gastrointestinal disturbances, muscular weakness, and increased blood pressure, among other things.

During water treatment, membrane scaling due to barium is well known. In order to protect membrane from scaling, a pretreatment for barium is required prior to pumping the water to membrane unit. Several methods have been developed to reduce barium concentration from groundwater and wastewater.

One method to reduce barium concentration is chemical precipitation of barium carbonate through lime softening. However, barium precipitation and removal by lime softening is a highly pH dependent process. The water must have a pH between 10.0 and 10.5 for efficient barium precipitation. Another method to reduce barium concentration is chemical precipitation of barium sulfate using coagulants such as alum or ferric sulfate. However, barium removal by a conventional coagulation process requires a two-stage precipitation system due to the slow precipitation kinetics of barium sulfate.

Another method to reduce barium concentration in water is the use of ion exchange systems. However, ion exchange systems require frequent resin regeneration using additional chemicals. The treatment, handling and disposal of the regenerant chemicals are a major drawback to this technique. Reverse osmosis (RO) systems have also been employed to reduce barium concentration in water. However, in RO systems, scaling often occurs on the RO membrane if the barium reacts with other contaminants in the water to form barium sulfate or barium carbonate. This reduces the efficiency of the RO unit and may damage the membrane. A final method employed to remove barium from water involves adsorption of barium onto magnesium hydroxide. However, this process is also a highly pH dependent process. The water must have a pH of approximately 11 for efficient barium adsorption and removal.

All of the above processes comprise several operational steps, are complicated, or are costly. Therefore, there is a need for a simple and cost effective method to remove barium from water

SUMMARY

A process is disclosed for removing barium from water. The process includes forming hydrous manganese oxide and mixing the hydrous manganese oxide with water containing barium such that the surface of hydrous manganese oxide is negatively charged at a pH greater than 5.0. The negatively charged hydrous manganese oxide contacts the water having the barium and the barium is adsorbed onto the hydrous manganese oxide. Thereafter, the hydrous manganese oxide with the adsorbed barium is separated from the water and a treated effluent is produced In one embodiment, the hydrous manganese oxide with adsorbed barium is separated from the water through a conventional flocculation and separation process. In another embodiment, the hydrous manganese oxide with adsorbed barium is separated from the water through a ballasted flocculation and separation process.

In another embodiment, the method or process includes forming hydrous manganese oxide solution and directing the solution to a fixed-bed reactor having inert media contained therein. The hydrous manganese oxide solution is directed into the fixed-bed reactor to coat the inert media. Thereafter, the water containing the barium is directed over the coated inert media. As the water passes over the coated inert media, barium in the water is adsorbed onto the hydrous manganese oxide coated on the media.

In addition, while removing soluble barium by adsorption onto the hydrous manganese oxide, this process will also remove soluble iron and manganese from water Other objects and advantages of the present invention will become apparent and obvious from a study of the following description and the accompanying drawings which are merely illustrative of such invention.

DESCRIPTION OF EXEMPLARY EMBODIMENTS

The present invention relates to an adsorption process for removing dissolved barium from water. To reduce the barium concentration in water, the contaminated water is mixed with a hydrous manganese oxide (HMO) solution. HMO is amorphous in character and has a highly reactive surface. Upon mixing water containing barium with the HMO solution, dissolved barium is adsorbed onto the reactive surface of the HMO. Then, the HMO and adsorbed barium are separated from the water to produce a treated effluent having a reduced barium concentration.

The iso-electric-point of HMO i.e., point of zero charge ($pH_{pzc}$) is between 4.8 and 5.0. The point of zero charge describes the pH condition of a solution at which the HMO surface has a net neutral charge. Thus, when HMO is submerged in a solution having a pH of between approximately 4.8 and approximately 5.0, the HMO surface will have a net zero charge. However, if the pH of solution is lower than approximately 4.8, the acidic water donates more protons than hydroxide groups causing the HMO surface to become positively charged. Similarly, when the pH of solution is higher than approximately 5.0, the HMO surface becomes negatively charged and will attract positively charged cations.

The typical pH of untreated groundwater and industrial wastewater ranges between approximately 6.5 and approximately 8.5. Therefore, when the untreated water containing barium ions comes in contact with the HMO in solution, the surface of the HMO becomes negatively charged and will attract positively charged barium ions, $Ba^{2+}$. The process described herein typically reduces the barium concentration in water or wastewater to approximately 50 ppb and in some circumstances may reduce the barium concentration to approximately 20 ppb or less.

Figure 1:
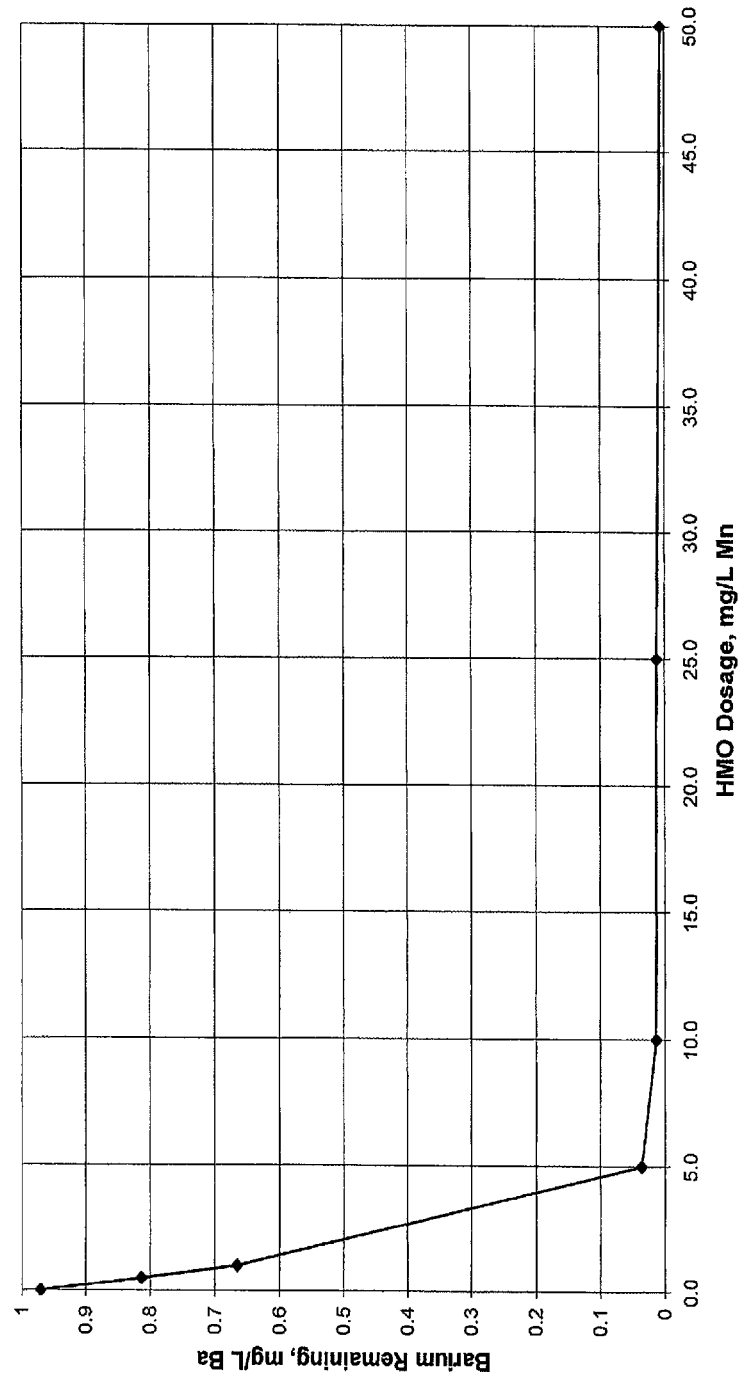
FIG. 1 is a line graph illustrating the adsorption capacity of HMO with respect to barium cation in water.

In testing, an HMO solution was prepared at a pH of 4.0 and slowly mixed overnight. Varying dosages of HMO solution were then mixed with water having a barium concentration of 1.00 mg/L. No other cations were present in the water. Each HMO dosage was mixed with the water for 4 hours. The pH of each reaction mixture was between 7.5 and 8.0. The line graph shown in FIG. 1 illustrates the adsorption capacity of HMO with respect to barium cations in water. As shown in the graph, the preferred concentration of the HMO solution is between approximately 5 and 10 mg/L for an influent barium concentration of approximately 1 mg/L in the untreated water.

Figure 2:
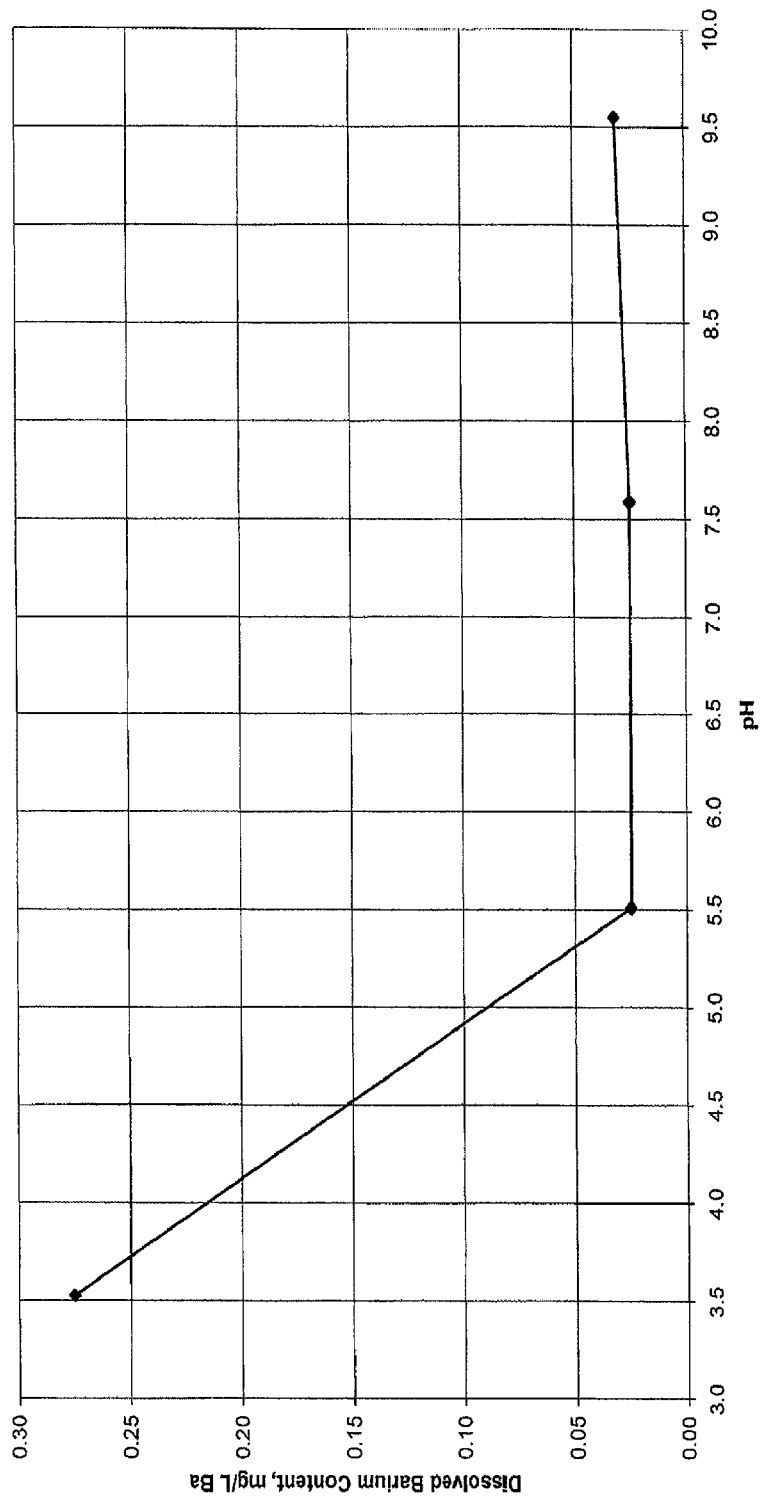
FIG. 2 is a line graph illustrating the pH conditions for the adsorption capacity of HMO with respect to barium cations in water.

Various pH conditions were also tested to determine the pH effect on the adsorption capacity of HMO. An HMO solution was prepared at a pH of 4.0 and slowly mixed overnight. HMO solution having a concentration of 10 mg/L was then added to water having a barium concentration of 1.00 mg/L. No other cations were present in the water. The HMO solution and the water were mixed together for 4 hours at various pH conditions. The line graph in FIG. 2 illustrates the optimum pH conditions for the adsorption capacity of HMO with respect to barium cations in water. As shown in FIG. 2, a pH at or above 5.5 is preferred.

Figure 3:
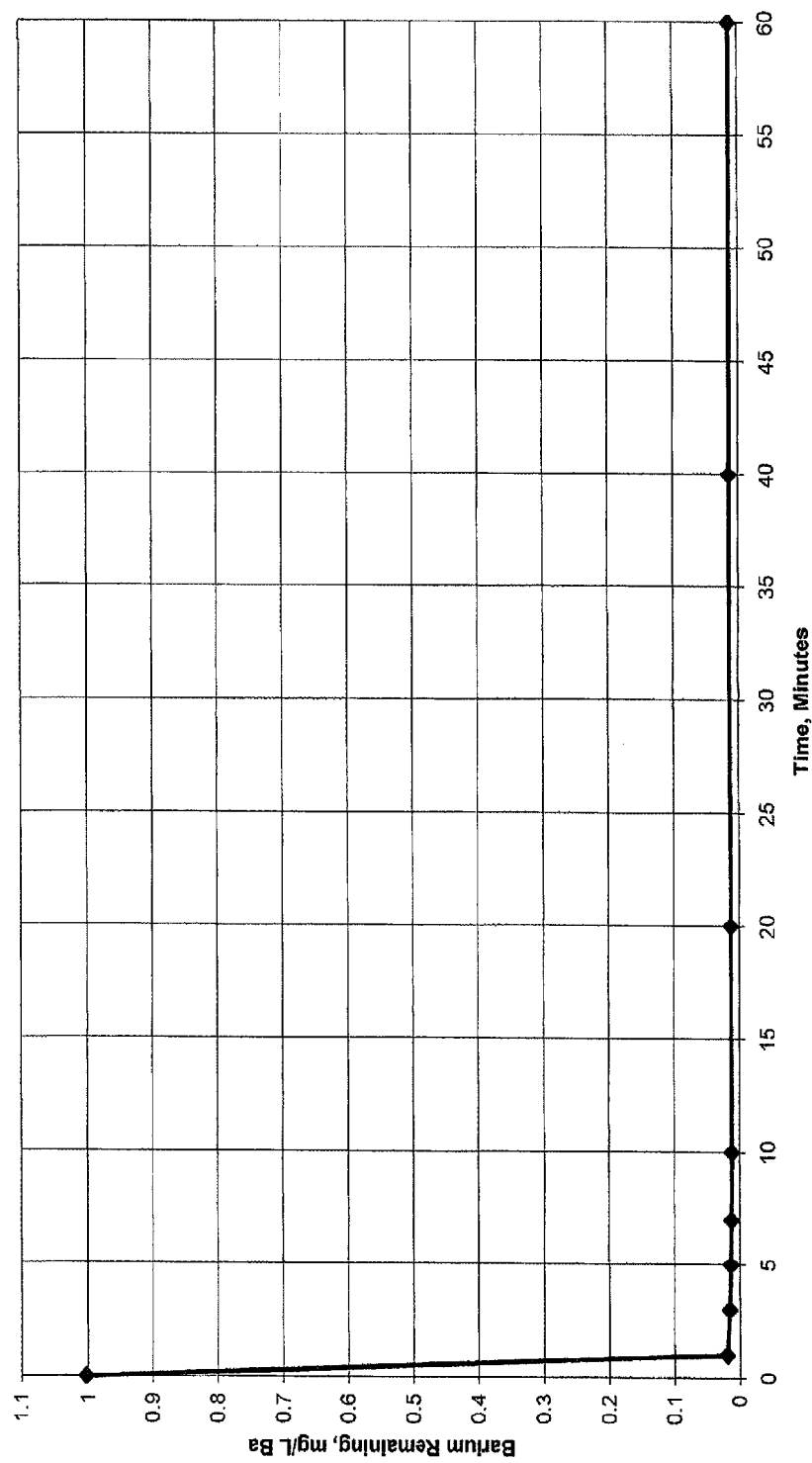
FIG. 3 is a line graph illustrating the barium removal rate of HMO from water.
Figure 4:
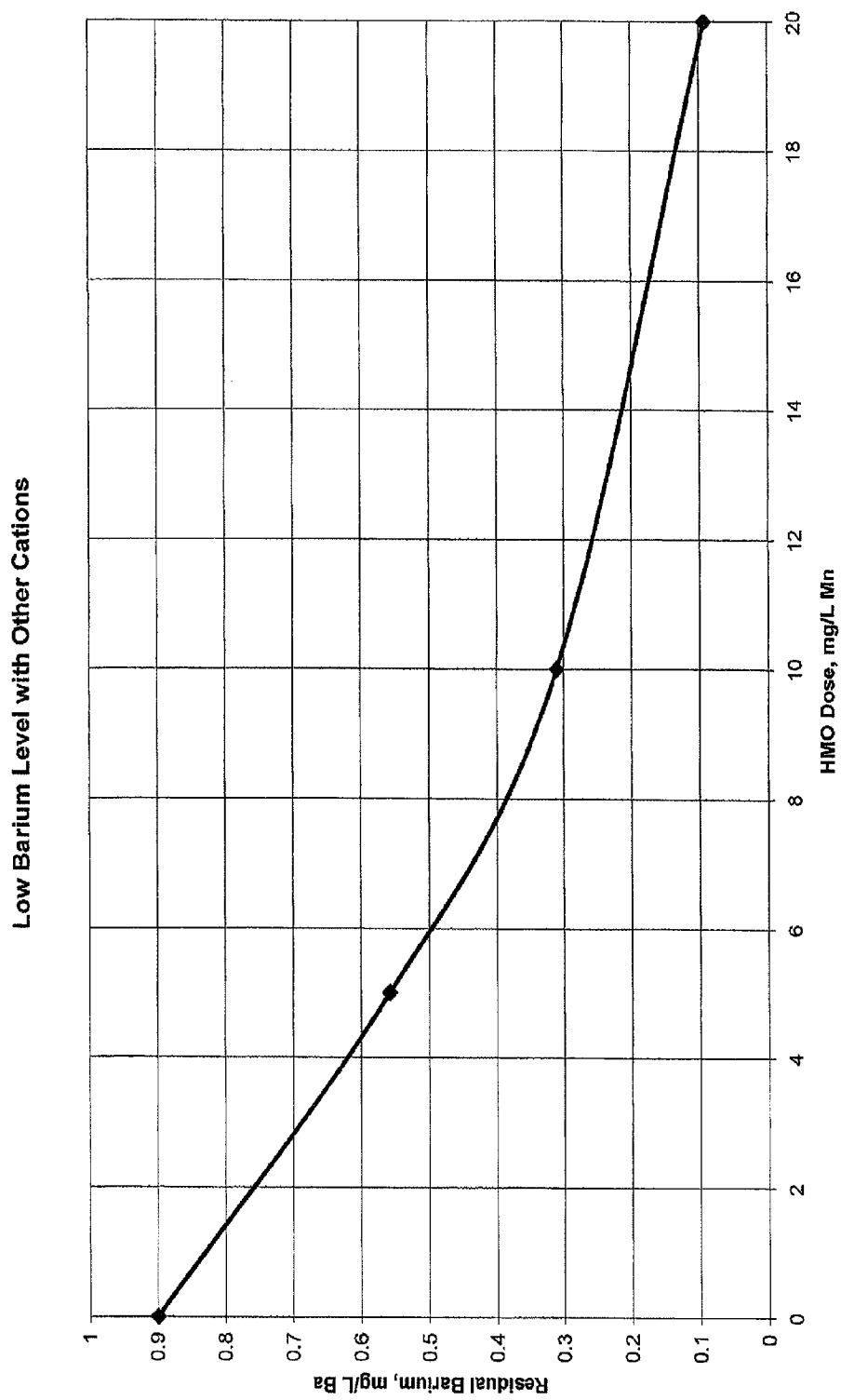
FIG. 4 is a line graph illustrating the adsorption capacity of various concentrations of HMO solution with respect to barium cations in the presence of competing cations.

The optimum reaction kinetics for barium adsorption onto HMO was also tested. An HMO solution was mixed with water containing about 1 mg/L of barium. The line graph in FIG. 3 indicates that barium uptake rate of the HMO is very fast. The adsorption capacity of HMO for barium in presence of other competing cation is shown in FIG. 4.

The above tests were conducted on water containing only barium cations. Therefore, additional testing was conducted to determine the impact of iron cations, $Fe^{2+}$, on the adsorption capacity of HMO with respect to barium ions. $Fe^{2+}$ was aerated in a solution at a pH of 7.5 for 30 minutes. A 1.00 mg/L $Ba^{2+}$ solution and a 10 mg/L of HMO solution were added to the $Fe^{2+}$ solution. The mixture was mixed for 10 minutes and then filtered through a 0.45 micron filter. The barium concentration of the treated water was reduced to 15 µg/L In addition, testing was conducted to determine the impact of Co-oxidized iron on the adsorption capacity of HMO with respect to barium ions. $Fe^{2+}$ and $Ba^{2+}$ were mixed together in solution. The $Ba^{2+}$ concentration was 1.00 mg/L. An HMO solution having a concentration of 10 mg/L was then added. The mixture was aerated for 30 minutes at a pH of 7.5. The mixture was then filtered through a 0.45 micron filter. The barium concentration of the treated water was reduced to 90 µg/L.

The barium adsorption process was also tested in the presence of several competing cations. In this example, various dosages of HMO were mixed with water containing several different cations for 10 minutes and at a pH of 7.5. The contaminants found in untreated water are given below in Table 1.

TABLE 1

| Contaminant | Influent Concentrations |
|---|---|
| $Ba^{2+}$ | 1.0 mg/L |
| $Ca^{2+}$ | 45 mg/L |
| $Mg^{2+}$ | 9.0 mg/L |
| $Sr^{2+}$ | 0.21 mg/L |
| $Fe^{3+}$ | 0.60 mg/L |
| $Mn^{2+}$ | 0.06 mg/L |
| Alkalinity | 280 mg/L as CaCO3 |

The line graph shown in FIG. 4 illustrates the adsorption capacity of various concentrations of HMO solution with respect to barium cations in the presence of competing cations.

In the above example, when the HMO solution had a concentration of 40 mg/L, the concentration of cations in the treated water were even further decreased, as shown in Table 2.

TABLE 2

| Contaminant | Effluent Concentrations |
|---|---|
| $Ba^{2+}$ | 0.038 mg/L |
| $Ca^{2+}$ | 39 mg/L |
| $Mg^{2+}$ | 8.5 mg/L |
| $Sr^{2+}$ | 0.15 mg/L |
| $Fe^{3+}$ | <0.01 mg/L |
| $Mn^{2+}$ | <0.02 mg/L |

Figure 5:
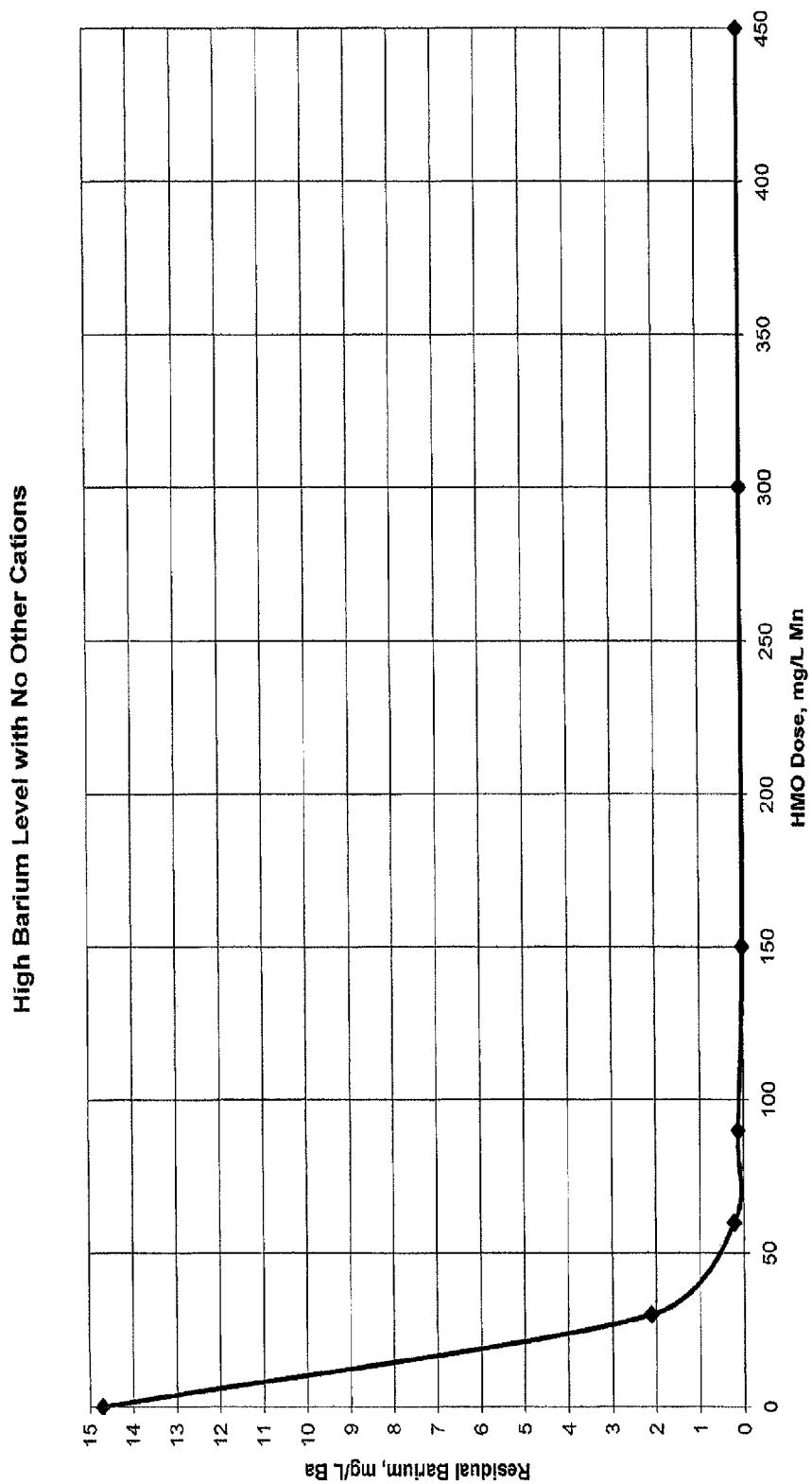
FIG. 5 is a line graph illustrating the adsorption capacity of HMO with respect to barium cations in water without the presence of competing cations.

The barium adsorption process of HMO was also tested in water containing a high concentration of barium and no competing cations. HMO was mixed with water having a barium concentration of 15 mg/L. The mixture was mixed for 10 minutes at a pH of between 7.5 and 8.0. Various concentrations of HMO were observed. The line graph shown in FIG. 5 illustrates the adsorption capacity of HMO with respect to barium cations without competing cations. As shown in the graph, one preferred concentration of the HMO solution is approximately 100 mg/L for a barium concentration of approximately 15 mg/L in the untreated water.

The barium adsorption process was also tested in water containing a high concentration of barium in the presence of competing cations. HMO was mixed with water having a barium concentration of 15 mg/L. The mixture was mixed for 10 minutes at a pH of between 7.5 and 8.0. Various concentrations of HMO were observed. The contaminants found in waste stream are given below in Table 3.

TABLE 3

| Contaminant | Influent Concentrations |
|---|---|
| $Ba^{2+}$ | 15 mg/L |
| $Ca^{2+}$ | 17 mg/L |
| $Mg^{2+}$ | 10 mg/L |
| $Sr^{2+}$ | 0.20 mg/L |
| $Fe^{3+}$ | 0.40 mg/L |

TABLE 3-continued

| Contaminant | Influent Concentrations |
| --- | --- |
| $Mn^{2+}$ | 0.06 mg/L |
| Alkalinity | 100 mg/L as $CaCO_3$ |

Figure 6:
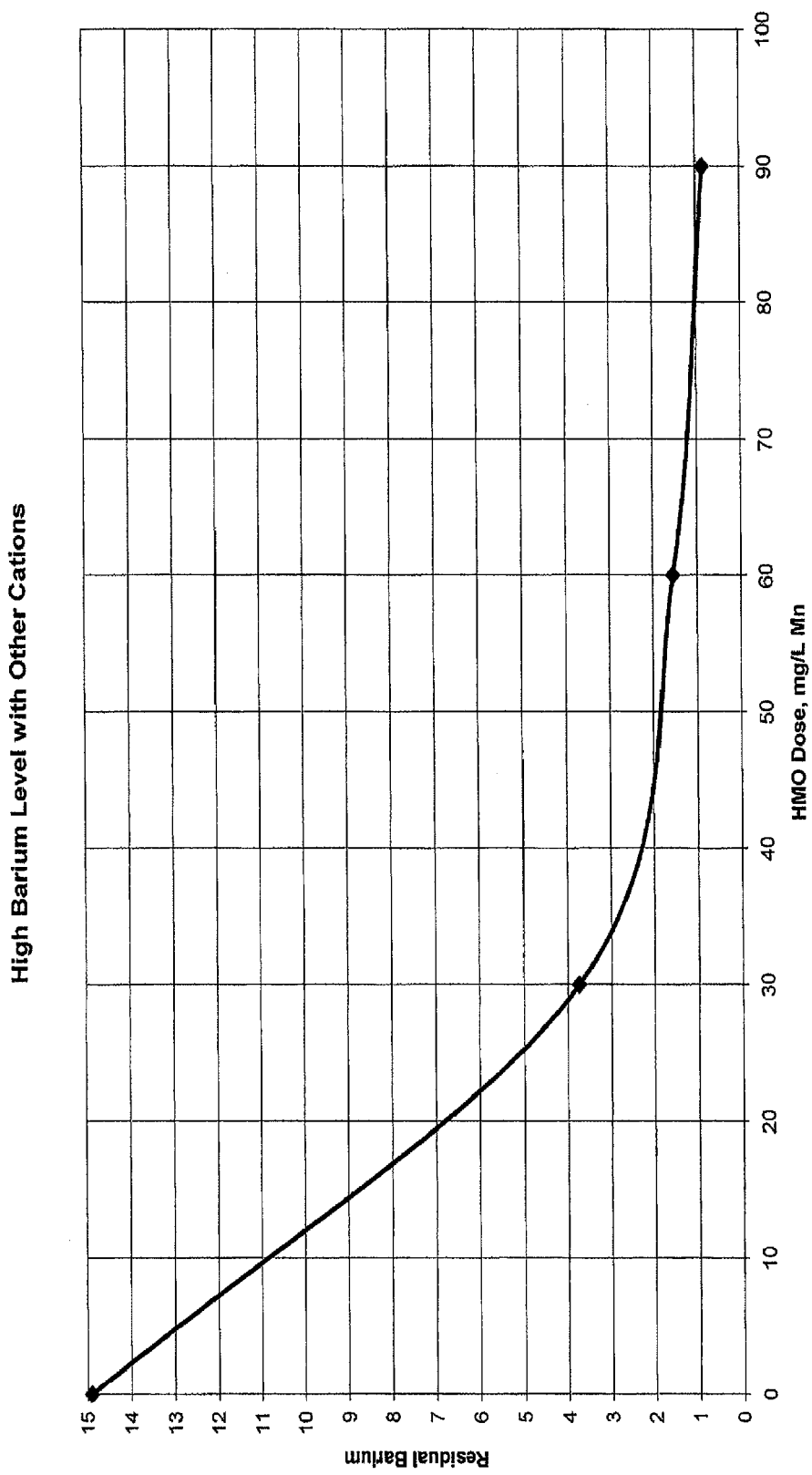
FIG. 6 is a line graph illustrating the adsorption capacity of HMO with respect to a high concentration in of barium cations in the presence of competing cations.

The line graph in FIG. 6 illustrates the adsorption capacity of HMO with respect to a high concentration in of barium cations in the presence of competing cations.

The barium adsorption process was tested in water containing a high concentration of barium in the presence of competing cations using an HMO concentration of 90 mg/L. HMO was mixed with water having a barium concentration of 15 mg/L. The mixture was mixed for 10 minutes at a pH of between 7.5 and 8.0. The competing contaminants found in waste stream and the effluent concentrations are given below in Table 4.

TABLE 4

| Contaminant | Effluent Concentrations |
| --- | --- |
| $Ba^{2+}$ | 0.85 mg/L |
| $Ca^{2+}$ | 11.5 mg/L |
| $Mg^{2+}$ | 9.0 mg/L |
| $Sr^{2+}$ | 0.10 mg/L |
| $Fe^{3+}$ | 0.01 mg/L |
| $Mn^{2+}$ | <0.01 mg/L |

Figure 7:
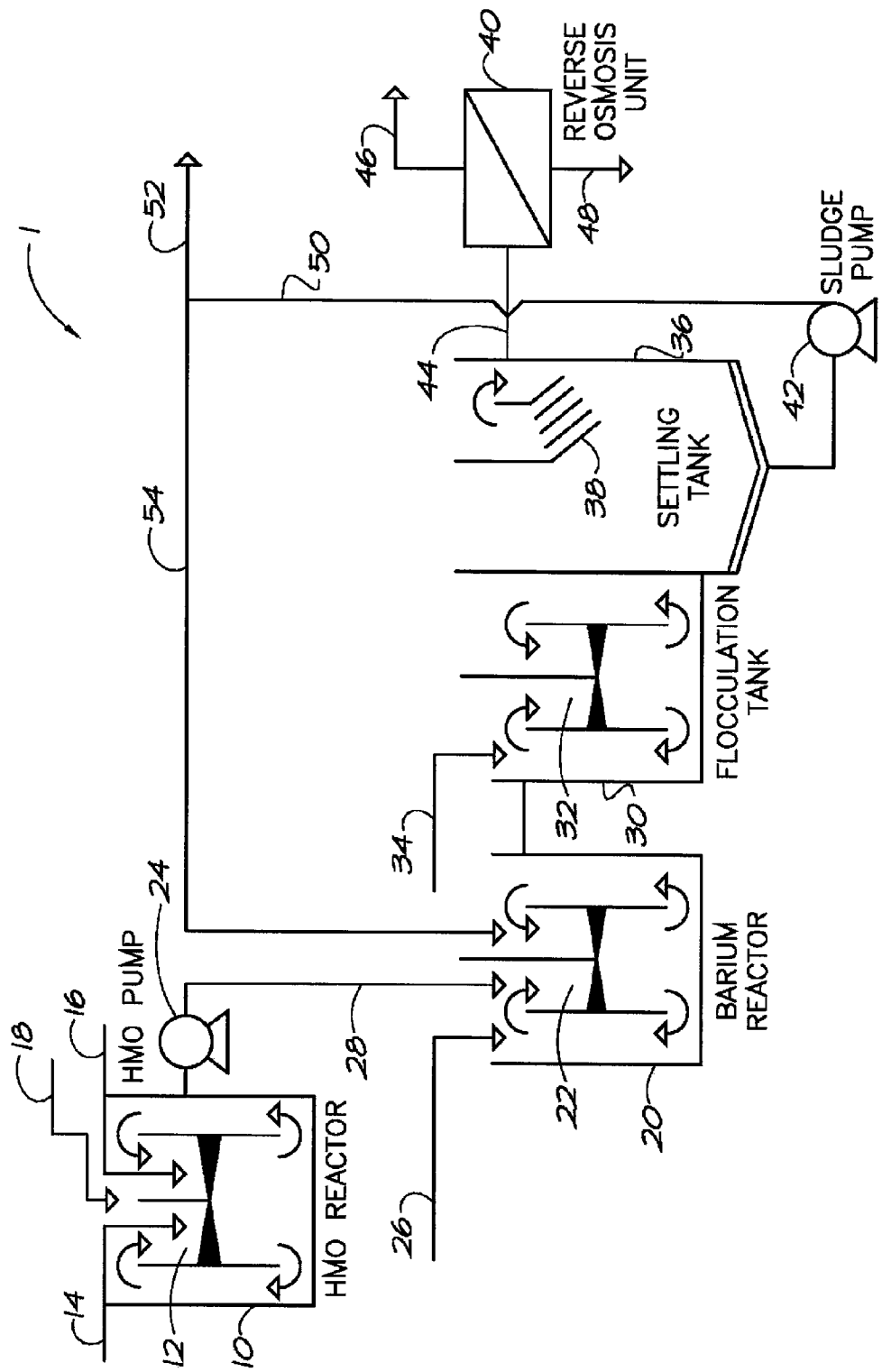
FIG. 7 is a schematic illustration depicting a system and process for removing barium from water using a mixed-bed flocculation system.

A barium removal process and system 1 that effectively reduces the barium concentration in water is illustrated in FIG. 7. An HMO solution is formed in HMO reactor 10. Table 5 describes several methods to form HMO.

TABLE 5

| Methods to form HMO | Redox Reactions |
| --- | --- |
| Oxidation of Manganous Ion ($Mn^{2+}$) by Permanganate Ion ($MnO_4^-$) | $3Mn^{2+} + 2MnO_4^- + 2H_2O \rightarrow 5MnO_{2(s)} + 4H^+$ |
| Oxidation of Manganous ion ($Mn^{2+}$) by Chlorine ($Cl_2$) | $Cl_2 + Mn^{2+} + 2H_2O \rightarrow MnO_{2(s)} + 2Cl^- + 4H^+$ |
| Oxidation of Ferrous Ion ($Fe^{2+}$) by Permanganate Ion ($MnO_4^-$) | $3Fe^{2+} + MnO_4^- + 7H_2O \rightarrow MnO_{2(s)} + 3Fe(OH)_3 + 5H^+$ |

In the embodiment described in FIG. 7, HMO is formed by mixing potassium permanganate ($KMnO_4$) solution and manganous sulfate ($MnSO_4$) solution in a downdraft tube 12. In one example, 42.08 g of $KMnO_4$ was added to HMO reactor 10 through line 14 and 61.52 g of $MnSO_4$ was added to HMO reactor 10 through line 16. These reagents were mixed in HMO reactor 10 to form an HMO solution. In this reaction, the optimum pH for HMO formation is approximately 4.0 to approximately 4.5. After HMO formation, NaOH was added to the HMO reactor 10 through line 18 to adjust the pH of the HMO solution to approximately 8.0.

After the HMO stock solution is prepared, a dosage of HMO solution is directed from reactor 10 into barium reactor 20 through line 28. The dosages of the HMO solution applied to barium reactor 20 may be controlled through pump 24. Water containing barium is added to barium reactor 20 through line 26 and mixed with the HMO solution.

In this embodiment, barium reactor 20 includes a downdraft tube 12 to mix the HMO solution and the water containing barium. As the HMO solution mixes with the water containing barium, the negatively charged HMO surface attracts the positively charged barium ions, which are adsorbed onto the HMO surface. Although reaction times may vary, the preferred reaction time in the barium reactor 20 is approximately 10 minutes.

To enhance settling and separation, the mixture of water and HMO with adsorbed barium is directed to a flocculation tank 30 where it is mixed with a flocculant to initiate floc formation. The flocculant is added through line 34. In this embodiment, flocculation tank 30 also includes a downdraft tube 32 to mix the HMO with adsorbed barium with the flocculant. One example of a flocculant is a polymeric flocculant.

In some embodiments, flocculation may not be necessary. However, in some cases, mixing a flocculant and the HMO with adsorbed barium is advantageous because the flocculant causes the HMO with adsorbed barium to aggregate around the flocculant and form floc. This enhances settling and separation of the HMO with adsorbed barium from the water.

The treated water, including the floc, flows from flocculation tank 30 into a solids/liquid separator such as settling tank 36. As the floc settle, treated effluent flows upward through a series of collection troughs or lamella 38 before the treated effluent is directed through line 44 for further treatment of other contaminants if required. For example, in one embodiment the treated effluent is directed through line 44 to an RO unit 40 for further clarification. Permeate from the RO unit 40 is collected through permeate line 46 and a reject stream is discharged through line 48. While FIG. 7 illustrates settling tank 36 having collection troughs or lamella 38, it will be appreciated by those skilled in the art that some settling tanks may not require such structures.

As the floc settle to the bottom of settling tank 36, sludge collects at the bottom of the tank. The sludge is pumped through pump 42 and into line 50, where at least a portion of the sludge including the HMO may be directed to barium reactor 20 through line 54 and reused in the system. The recycled HMO promotes additional adsorption of barium in the waste stream by utilizing the unused reactive HMO adsorption sites. The remaining sludge may be discharged directly through line 52 or may be thickened and dewatered prior to disposal.

In some embodiments, ballasted flocculation systems may be used in lieu of a conventional clarifier. A ballasted flocculation system utilizes microsand or other ballast to form floc. For a detailed understanding of ballasted flocculation processes, reference is made to U.S. Pat. Nos. 4,927,543 and 5,730,864, the disclosures of which are expressly incorporated herein by reference.

Figure 8:
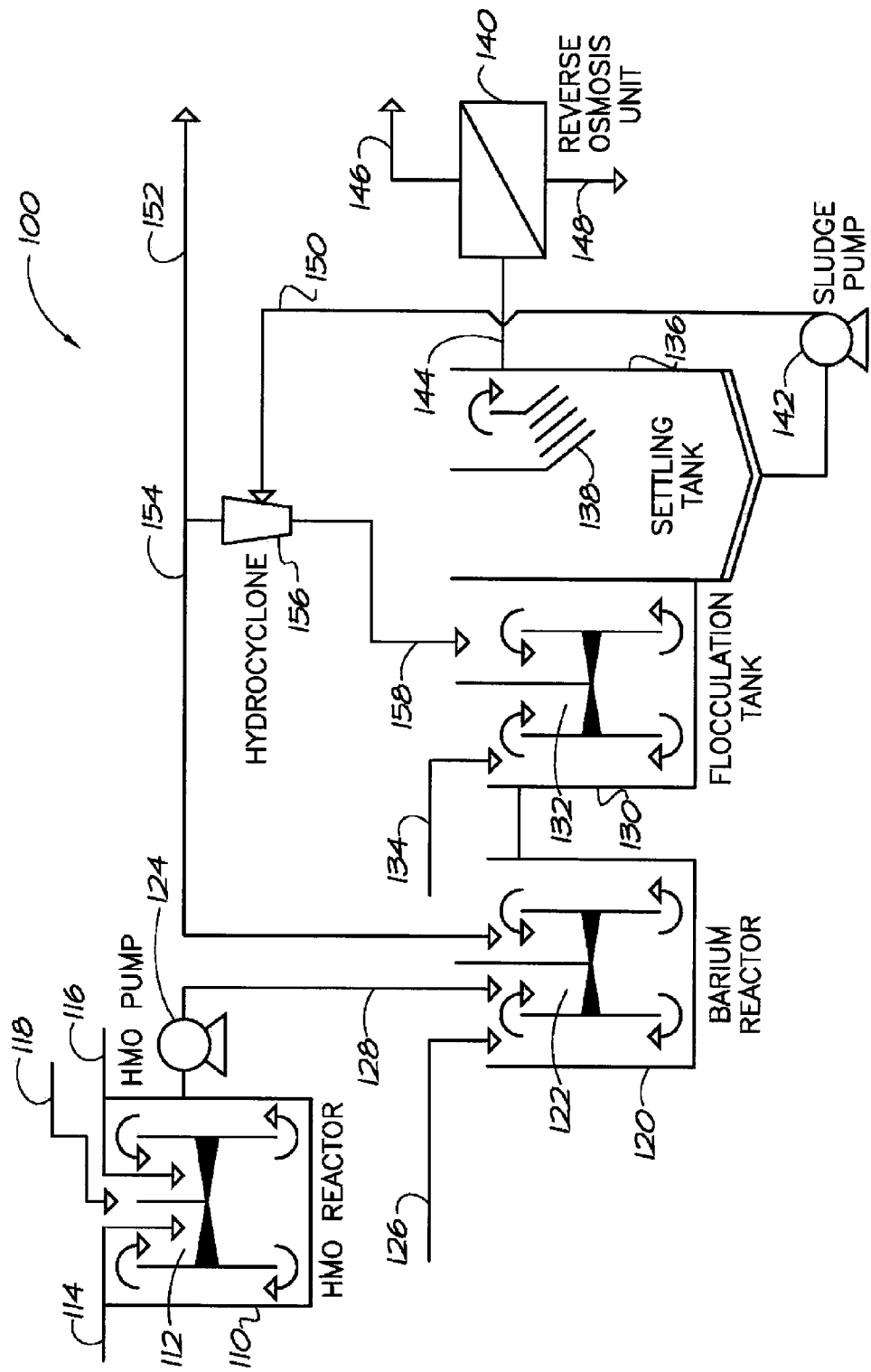
FIG. 8 is a schematic illustration depicting a system and process for removing barium from water using a mixed-bed micro-sand ballasted flocculation system.

FIG. 8 illustrates a system 100 and method for removing barium from water using a ballasted flocculation system. In this embodiment, HMO is formed in reactor 110 using a downdraft tube 112. In this embodiment, $KMnO_4$ was added to HMO reactor 110 through line 114 and $MnSO_4$ was added to reactor 110 through line 116. In addition, NaOH was added to the HMO solution in HMO reactor 110 through line 118 to adjust the pH of the HMO.

After the HMO stock solution is prepared, a dosage of HMO solution is directed from HMO reactor 110 into barium reactor 120 through line 128. The dosages of the HMO solution applied to barium reactor 120 may be controlled through pump 124. Water containing barium is added to barium reactor 120 through line 126 and mixed with the HMO solution. In this embodiment, barium reactor 120 includes a downdraft tube 122 to mix the HMO solution and the water containing barium. As the HMO in solution mixes with the water containing barium, the negatively charged HMO surface attracts the positively charged barium ions, which are adsorbed onto the HMO surface. Although reaction times may vary, the preferred reaction time in the barium reactor 120 is approximately 10 minutes.

The mixture of water and HMO with adsorbed barium is then directed to ballasted flocculation tank 130 where it is mixed with a ballast, such as microsand and a flocculant in a downdraft tube 132. The flocculant is added through line 134 and the ballast is added through line 158. The HMO with adsorbed barium aggregates and builds up around the ballast to form floc.

The treated water, including the floc, flows from flocculation tank 130 into a solids separator such as a settling tank 136. As the ballasted flocs settle, treated effluent flows upward through a series of collection troughs or lamella 138 before the treated effluent is directed for further treatment for other contaminants if required. For example, in one embodiment the treated effluent is directed to an RO unit 140 for further clarification. Permeate from the RO unit 140 is collected through permeate line 146 and a reject stream is discharged through line 148. While FIG. 8 illustrates a settling tank 136 having collection troughs or weirs 138, it will be appreciated by those skilled in the art that some settling tanks may not require such structures.

As the ballasted floc settles to the bottom of settling tank 136, sludge collects at the bottom of the tank. The sludge is pumped through pump 142 and at least a portion of the sludge may be directed to a separator 156, such as a hydrocyclone. During separation in the hydrocyclone, lighter density sludge, containing HMO with adsorbed barium is separated from the higher density sludge containing ballast. At least a portion of the ballast may be directed to flocculation tank 130 and reused in the process. The recycled ballast promotes additional flocculation of HMO with adsorbed barium. The lighter density sludge containing HMO with adsorbed barium is collected from the top of the hydrocyclone, and a portion of the lighter density sludge may be directed to barium reactor 120 through line 154 and reused in the process. The recycled HMO promotes additional adsorption of barium in the waste stream. A portion of the higher density sludge containing ballast may be collected from hydrocyclone 156 and directed to flocculation tank 130 through line 158. The remaining sludge may be discharged directly through line 152 or may be thickened and dewatered prior to disposal.

Figure 9:
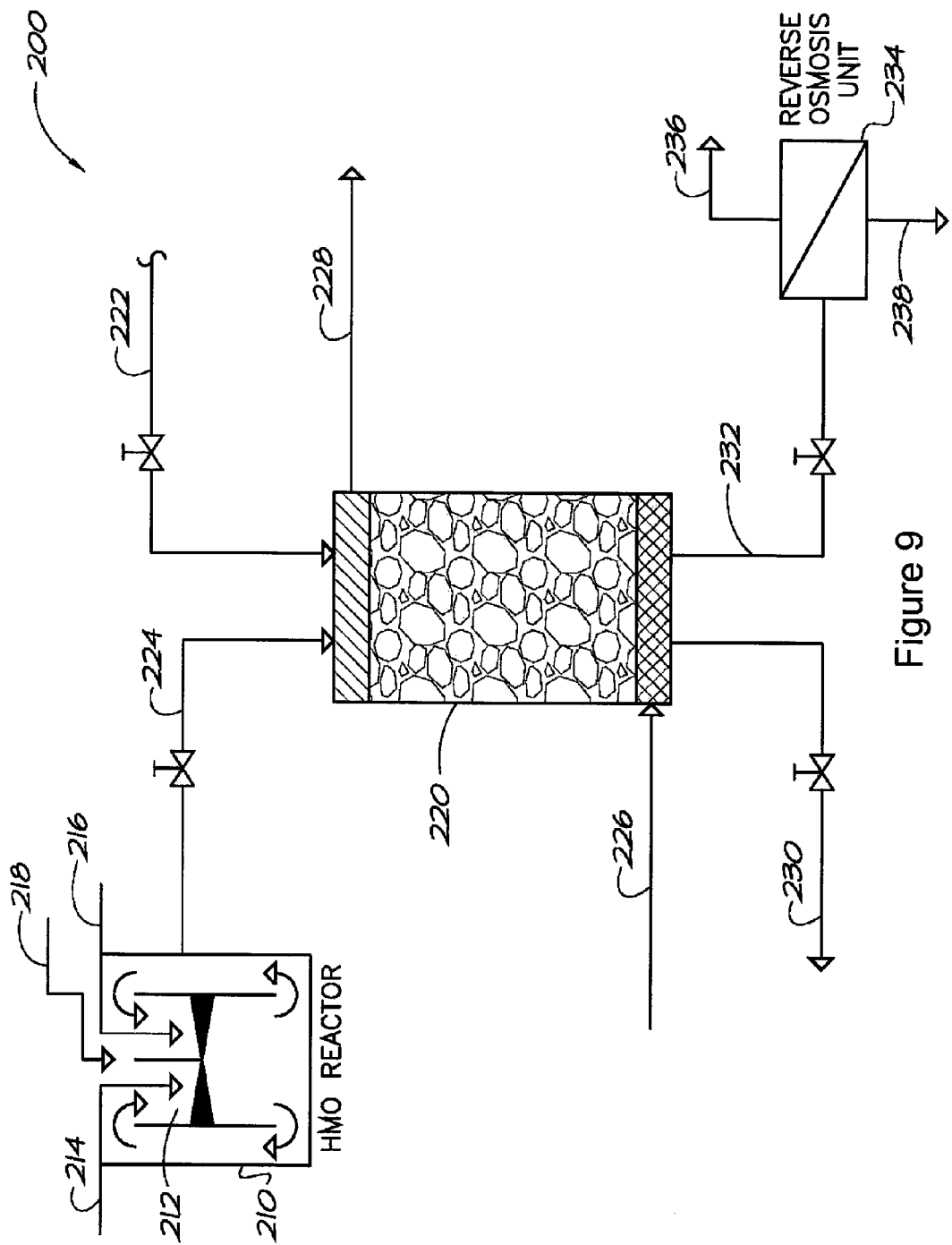
FIG. 9 is a schematic illustration depicting a system and process for removing barium from water using a fixed-bed system.

Another embodiment of the present invention is illustrated in FIG. 9. In this embodiment, barium is removed from a waste stream in a fixed-bed system 200. In this embodiment, KMnO$_4$ was added to HMO reactor 210 through line 214 and MnSO$_4$ was added to reactor 210 through line 216. In addition, NaOH was added to the HMO solution in HMO reactor 210 through line 218 to adjust the pH of the HMO. HMO solution is formed in reactor 210 using a downdraft tube 212. The HMO solution is injected into a packed fixed-bed column 220 containing inert media such as sand or carbon. The HMO solution coats the inert media before the water containing barium is injected into the column. The HMO solution may be injected through line 224 into column 220. Excess HMO is discharged from the column 220 through line 230. Water containing barium may be injected through line 222 into column 220 at a specified hydraulic loading rate, in either a down-flow or in an up-flow mode.

As the water containing barium contacts the HMO coated on the inert media, the negatively charged HMO surface attracts the positively charged barium ions in the water, which are adsorbed onto the HMO surface. Depending on the configuration of the column, either down-flow or up-flow, treated effluent with a reduced barium concentration is collected either from the bottom or top of the column respectively.

Treated effluent is discharged from column 220 through line 232 and may be diverted for further treatment for other contaminants if required. For example, in one embodiment the treated effluent is directed through line 232 into an RO unit 234 for further clarification. A permeate is collected through permeate line 236 and a reject stream is discharged through line 238. HMO with adsorbed barium may be removed from the column by backwashing. Backwash fluid enters column 220 through line 226. The sludge collected after backwashing may be directed through line 228 and collected in a sludge storage tank for disposal.

A fixed-bed system such as the one described above is advantageous because it may be applied as an add-on process in a plant without disturbing the existing treatment system.

As used herein, the term "water" refers to any water stream containing barium, including water, wastewater, groundwater, and industrial wastewater. As used herein, "HMO" refers to all types of hydrous manganese oxides, including hydrous manganese (III) oxide and hydrous manganese (II) oxide. However, hydrous manganese (IV) oxide has a higher adsorption capacity over other hydrous manganese oxides and thus hydrous manganese (IV) oxide is preferred to adsorb barium.

The present invention may of course be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced herein.

The invention claimed is:

1. A process for removing barium from water comprising:
   forming hydrous manganese oxide;
   mixing the hydrous manganese oxide with water containing barium such that the hydrous manganese oxide is negatively charged at a pH greater than 4.8;
   adsorbing barium from the water onto the negatively charged hydrous manganese oxide;
   mixing a flocculant with the water and hydrous manganese oxide with adsorbed barium;
   forming sludge, wherein the sludge includes floc having hydrous manganese oxide with adsorbed barium; and
   separating the sludge having hydrous manganese oxide with adsorbed barium from the water and producing a treated effluent.

2. The process of claim 1 further comprising forming the hydrous manganese oxide by one of the following methods:
   oxidizing manganous ion with permanganate ion, oxidizing manganous ion with chlorine, or oxidizing ferrous ion with permanganate ion.

3. The process of claim 2 further comprising:
   forming the hydrous manganese oxide by mixing manganese (II) sulfate with potassium permanganate;
   directing the hydrous manganese oxide to a reactor; and
   mixing the hydrous manganese oxide with the water containing barium.

4. The process of claim 3 further comprising:
   directing the manganese (II) sulfate and the potassium permanganate into a downdraft tube having a mixer disposed within the downdraft tube;
   inducing the manganese (II) sulfate and potassium permanganate downwardly through the downdraft tube; and
   mixing the manganese (II) sulfate and the potassium permanganate with the mixer disposed in the downdraft tube.

5. The process of claim 1 further including:
   recycling at least a portion of the sludge; and mixing a portion of the recycled sludge with the hydrous manganese oxide and the water containing barium.

6. The method of claim 1 including directing the treated effluent to a reverse osmosis unit and producing a permeate stream and a reject stream.

7. The method of claim 1 including separating the hydrous manganese oxide with adsorbed barium from the water by a ballasted flocculation process.

8. The method of claim 7 wherein the ballasted flocculation process includes:
mixing a flocculant and a ballast and the hydrous manganese oxide with adsorbed barium to produce ballasted floc;
settling the ballasted floc to form sludge;
directing the sludge to a separator and separating the ballast from the sludge; and
recycling the ballast to the ballasted flocculation system.

9. The process of claim 8 wherein forming sludge includes:
forming lighter density sludge and higher density sludge, the lighter density sludge containing hydrous manganese oxide with adsorbed barium and the higher density sludge containing ballast; and
separating at least a portion of the lighter density sludge from the higher density sludge.

10. The method of claim 9 further comprising:
recycling at least a portion of the lighter density sludge containing hydrous manganese oxide with adsorbed barium; and
mixing at least a portion of the recycled lighter density sludge with the hydrous manganese oxide and the water containing barium.

11. The process of claim 1 further comprising:
coating an inert material in a fixed-bed system with hydrous manganese oxide;
injecting the water containing barium into the fixed-bed system;
adsorbing barium from the water onto the hydrous manganese oxide coated on the inert material; and
producing a treated effluent.

12. The process of claim 1 further comprising treating the water containing barium with hydrous manganese oxide such that the treated effluent has a barium concentration of approximately 50 ppb or less.

13. The process of claim 12 further comprising treating the water containing barium with hydrous manganese oxide such that the treated effluent has a barium concentration of approximately 20 ppb or less.

14. The process of claim 1 wherein the water containing barium has a pH between 5.0 and 10.0.

15. The method of claim 1 wherein hydrous manganese oxide has a concentration of between approximately 5 and 10 mg/L for every 1 mg/L of barium in the untreated water.

16. A method for removing barium from water comprising:
forming a hydrous manganese oxide solution in a first tank;
directing the hydrous manganese oxide solution to a barium reactor;
mixing water containing barium with the hydrous manganese oxide solution in the barium reactor to form a hydrous manganese oxide solution-water mixture in the barium reactor, wherein the pH of the hydrous manganese oxide solution-water mixture gives rise to a negative charge on the surface of the hydrous manganese oxide;
adsorbing barium from the water onto the negatively charged surface of the hydrous manganese oxide in the hydrous manganese oxide solution-water mixture;
directing the hydrous manganese oxide solution-water mixture to a flocculation tank;
mixing a flocculant with the hydrous manganese oxide solution-water mixture;
forming floc in the hydrous manganese oxide solution-water mixture, wherein the floc includes the hydrous manganese oxide with absorbed barium and wherein the floc forms sludge;
after mixing the flocculant with the hydrous manganese oxide solution-water mixture, directing the hydrous manganese oxide solution-water mixture, including the floc, to a settling tank;
settling the sludge in the settling tank and producing a treated effluent; and
directing the sludge, including the hydrous manganese oxide with absorbed barium, from the settling tank.

17. The method of claim 16 including:
separating at least a portion of the hydrous manganese oxide with adsorbed barium from the sludge; and
recycling the separated hydrous manganese oxide with adsorbed barium by mixing the hydrous manganese oxide solution and the water containing barium with the separated hydrous manganese oxide with adsorbed barium.

18. The method of claim 16 further comprising forming the hydrous manganese oxide solution having a pH of approximately 4.0.

19. The method of claim 18 further comprising mixing the hydrous manganese oxide with water containing barium such that the pH of the mixture is approximately 5.5 or higher.

20. The method of claim 16 further comprising removing iron and manganese from the water by adsorbing iron and manganese from the water onto the negatively charged surface of the hydrous manganese oxide.

21. A method for removing barium from water comprising:
forming a hydrous manganese oxide solution in a first tank;
directing the hydrous manganese oxide solution to a barium reactor;
mixing water containing barium with the hydrous manganese oxide solution in the barium reactor to form a hydrous manganese oxide solution-water mixture, wherein the pH of the hydrous manganese oxide solution-water mixture gives rise to a negative charge on the surface of the hydrous manganese oxide;
adsorbing barium from the water onto the negatively charged surface of the hydrous manganese oxide;
directing the hydrous manganese oxide solution-water mixture to a flocculation tank;
mixing a flocculent and a ballast with the hydrous manganese oxide solution-water mixture;
forming floc, wherein the floc includes the ballast and the manganese oxide with the adsorbed barium;
after mixing the flocculent and ballast with the hydrous manganese oxide solution-water mixture, directing the hydrous manganese oxide solution-water mixture to a settling tank;
settling the floc in the settling tank to form sludge and producing a treated effluent;
directing the sludge from the settling tank to a separator and separating at least some of the ballast from the sludge; and
recycling the separated ballast and mixing the separated ballast with the hydrous manganese oxide solution-water mixture.

22. The method of claim 21 including:
separating at least a portion of the manganese oxide with adsorbed barium from the sludge;

recycling the separated manganese oxide with adsorbed barium; and mixing the separated manganese oxide with adsorbed barium and the hydrous manganese oxide solution-water mixture.

23. The method of claim 22 including directing the treated effluent to a reverse osmosis unit and filtering the treated effluent to produce a permeate stream and a reject stream.

24. The method of claim 21 wherein the barium reactor includes a downdraft tube having a mixer disposed therein, wherein the method includes:

directing the hydrous manganese oxide solution and water containing barium into the top of the downdraft tube; and inducing the hydrous manganese oxide solution and water containing barium downwardly through the tube;

mixing the hydrous manganese oxide solution and water containing barium as the hydrous manganese oxide solution and water containing barium move downwardly through the downdraft tube.

25. The method of claim 22 wherein the flocculation tank includes a downdraft tube and a mixer disposed within the downdraft tube, and wherein the method includes utilizing the mixer in the downdraft tube to mix the flocculent and ballast with the hydrous manganese oxide solution-water mixture.

26. A method of removing barium from water comprising:
forming a hydrous manganese oxide solution;
directing the hydrous manganese oxide solution to a fixed-bed reactor having inert media contained therein;
directing the hydrous manganese oxide solution over the inert media and coating the inert media with hydrous manganese oxide contained in the hydrous manganese oxide solution;
directing the water having barium to the fixed-bed reactor;
directing the water having barium over the coated inert media; and
removing barium from the water by adsorbing barium from the water onto the hydrous manganese oxide coated on the inert media as the water passes over the inert media.

27. The method of claim 26 wherein a portion of the hydrous manganese oxide solution directed over the inert media exits the fixed-bed reactor and the method includes recycling at least some of the exiting hydrous manganese oxide solution for storing at least a portion thereof for future use.

28. The method of claim 26 including from cleaning the inert media by directing a cleaning solution through the fixed-bed reactor and removing the manganese oxide having adsorbed barium from the inert media.

29. The method of claim 26 further comprising directing water containing barium through a micro-filtration or a nano-filtration membrane before adsorbing barium from the water onto the hydrous manganese oxide coated on the inert media.

30. The method of claim 26 further comprising directing water containing barium through a reverse osmosis membrane before adsorbing barium from the water onto the hydrous manganese oxide coated on the inert media.

31. A process for removing barium from water comprising:
forming hydrous manganese oxide;
mixing the hydrous manganese oxide with water containing barium such that the hydrous manganese oxide is negatively charged at a pH greater than 4.8;
adsorbing barium from the water onto the negatively charged hydrous manganese oxide;
separating the hydrous manganese oxide with adsorbed barium from the water and producing a treated effluent; and
including directing the treated effluent to a reverse osmosis unit and producing a permeate stream and a reject stream.

32. A process for removing barium from water comprising:
forming hydrous manganese oxide;
mixing the hydrous manganese oxide with water containing barium such that the hydrous manganese oxide is negatively charged at a pH greater than 4.8;
adsorbing barium from the water onto the negatively charged hydrous manganese oxide;
separating the hydrous manganese oxide with adsorbed barium from the water and producing a treated effluent; and
wherein separating the hydrous manganese oxide with adsorbed barium from the water includes separating the hydrous manganese oxide with the adsorbed barium from the water by a ballasted flocculation process.

33. A process for removing barium from water comprising:
forming hydrous manganese oxide;
mixing the hydrous manganese oxide with water containing barium such that the hydrous manganese oxide is negatively charged at a pH greater than 4.8;
adsorbing barium from the water onto the negatively charged hydrous manganese oxide;
separating the hydrous manganese oxide with adsorbed barium from the water and producing a treated effluent;
coating an inert material in a fixed-bed system with hydrous manganese oxide;
injecting the water containing barium into the fixed-bed system;
adsorbing barium from the water onto the hydrous manganese oxide coated on the inert material; and
producing a treated effluent.

\* \* \* \* \*